(12) United States Patent
Samii et al.

(10) Patent No.: US 7,662,518 B1
(45) Date of Patent: Feb. 16, 2010

(54) SHUTDOWN SEPARATORS WITH IMPROVED PROPERTIES

(76) Inventors: Abbas Samii, 25 Hurley St., Belmont, MA (US) 02478; Garrin Samii, 25721 Califia Dr., Laguna Hills, CA (US) 92653; David Veno, 122 Burlington St., Woburn, MA (US) 01801

( * ) Notice: Subject to any disclaimer, the term of this patent is extended or adjusted under 35 U.S.C. 154(b) by 310 days.

(21) Appl. No.: 11/952,892

(22) Filed: Dec. 7, 2007

Related U.S. Application Data

(63) Continuation-in-part of application No. 11/161,331, filed on Jul. 29, 2005, now Pat. No. 7,323,274, and a continuation-in-part of application No. 11/161,194, filed on Jul. 26, 2005, now Pat. No. 7,323,273, and a continuation-in-part of application No. 10/709,545, filed on May 12, 2004, now Pat. No. 6,949,315.

(51) Int. Cl.
*H01M 2/14* (2006.01)
*H01M 2/16* (2006.01)

(52) U.S. Cl. .......... 429/251; 429/129; 429/142; 429/145

(58) Field of Classification Search .......... 429/251, 429/145
See application file for complete search history.

(56) References Cited

U.S. PATENT DOCUMENTS 5,641,565 A * 6/1997 Sogo .................. 428/315.7
6,372,379 B1 * 4/2002 Samii et al. .......... 429/145

* cited by examiner

*Primary Examiner*—Patrick Ryan
*Assistant Examiner*—Ashley Kwon
(74) *Attorney, Agent, or Firm*—Mark P. White

(57) ABSTRACT

A microporous polyolefin battery separator membrane is extremely high in porosity, high in puncture strength, very low in shrinkage and with shutdown temperature of 130-140 degrees C. and melt integrity greater than 165 degrees C. It consists of 20-30% by weight of a UHMW polyethylene having Mw of $1\times10^6$ or higher, 60-70% by weight of a HDPE having average Mw of between 200,000-500,000 and 5-15% by weight of $TiO_2$ with an average particle size of less than 0.2 microns.

6 Claims, 4 Drawing Sheets

TABLE 1

| Examples | | | | | | | | | |
|---|---|---|---|---|---|---|---|---|---|
| Membrane Composition (parts by weight) | 1 | 2 | 3 | 4 | 5 | 6 | 7 | 8 | 9 |
| UHMWPE (M wt.= 1x10⁶) | 17 | 18 | 19 | 20 | 0 | 0 | 0 | 0 | 0 |
| UHMWPE (M wt.= 3x10⁶) | 0 | 0 | 0 | 0 | 8 | 8 | 4 | 4 | 1 |
| LMWPE (M wt.=1000) | 0 | 0 | 0 | 0 | 10 | 9 | 5 | 4 | 0 |
| TiO$_2$ | 3 | 2 | 1 | 0 | 2 | 2 | 6 | 6 | 6 |
| Thickness (μm) | 25 | 25 | 25 | 25 | 25 | 25 | 25 | 25 | 25 |
| Porosity (%) | 74 | 68 | 55 | 51 | 52 | 52 | 51 | 59 | 64 |
| Air permeability (Gurley-sec.) | 2 | 2 | 2 | 2 | 27 | 16 | 15 | 13 | 8 |
| Shutdown Temp. T$_{SD}$ (°C) | 138 | 138 | 138 | 138 | 100 | 105 | 138 | 145 | >200 |
| Melt Integrity (°C) | >200 | >200 | >200 | >165 | >200 | >200 | >200 | >200 | >200 |
| Average pore diameter (μm) | <1 | <1 | <1 | <1 | <1 | <1 | <1 | <1 | <1 |
| Puncture, 3mm pin (grams/25μm) | 726 | 771 | 863 | 1000 | 636 | 817 | 812 | 726 | 545 |

Fig. 1

TABLE 2

| Example 10 ||
|---|---|
| Membrane Composition (by weight percentage) | 5E10-4ESNK1 |
| UHMWPE (M wt.= 1x10⁶) | 86.7% |
| UHMWPE (M wt.= 3x10⁶) | 6.6% |
| UHMWPE (M wt.= 5x10⁶) | 0% |
| LMWPE (M wt.=1000) | 0% |
| $TiO_2$ | 6.6% |
| Process* ||
| Stretching Temperature (°C) in transverse direction (TD) | 120(dry) |
| Annealing Temperature (°C) | 100 |
| Results ||
| Thickness (μm) | 25 |
| Porosity (%) | 55 |
| Air permeability (Gurley- sec.) | 2.5 |
| Shutdown Temp. $T_{SD}$ (°C) | 140 |
| Melt Integrity (°C) | >200 |
| Average pore diameter (μm) | <1 |
| Puncture, 3mm pin (grams/25μm) | 900 |
| Thermal Stability (% TD shrinkage at 100°C) | 0.81% |

* (dry) indicates that the stretching step was done after oil extraction step

Fig. 2

TABLE 3

| Examples | | | |
|---|---|---|---|
| Membrane Composition (by weight percentage) | 11 5E18-4SE | 12 4C31-2 | 13 5E11-2SE |
| UHMWPE (M wt.= $1\times10^5$) | 0% | 0% | 60.52% |
| UHMWPE (M wt.= $3\times10^6$) | 44.45% | 0% | 6.58% |
| UHMWPE (M wt.= $5\times10^6$) | 0% | 44.45% | 0% |
| LMWPE (M wt.=1000) | 44.45% | 44.45% | 26.32% |
| $TiO_2$ | 11.10% | 11.10% | 6.58% |
| Process* | | | |
| Stretching Temperature (°C) in transverse direction (TD) | 80(wet) | 100(wet) | 80(wet) |
| Annealing Temperature (°C) | 70 | 70 | 70 |
| Results | | | |
| Thickness (μm) | 25 | 25 | 25 |
| Porosity (%) | 47 | 52 | 53 |
| Air permeability (Gurley-sec.) | 65 | 27 | 24 |
| Shutdown Temp. $T_{SD}$ (°C) | 100 | 110 | 130 |
| Melt Integrity (°C) | >200 | >200 | >165 |
| Average pore diameter (μm) | <1 | <1 | <1 |
| Puncture, 3mm pin (grams/25μm) | 630 | 640 | 630 |
| Thermal Stability (% TD shrinkage at 100°C) | 5.5% | 7% | 12% |

*(wet) indicates that the stretching step was done prior to oil extraction step.

Fig. 3

TABLE 4

| Examples Membrane Composition (by weight percentage) | 14 | 15 | 16 | 17 | 18 | 19 | 20 |
|---|---|---|---|---|---|---|---|
| UHMWPE (M wt.= $1\times10^6$) | 25.0% | 25.0% | | | | | |
| UHMWPE (M wt.= $3\times10^6$) | | | 25.0% | 25.0% | | | |
| UHMWPE (M wt.= $5\times10^5$) | | | | | 25.0% | 25.0% | |
| HDPE (M wt.= $5\times10^5$) | 65.0% | | 65.0% | | 65.0% | | 65.0% |
| HDPE (M wt.= $2\times10^5$) | | 65.0% | | 65.0% | | 65.0% | |
| Polypropylene | | | | | | | 25.0% |
| $TiO_2$ | 10% | 10% | 10% | 10% | 10% | 10% | 10% |
| Process | | | | | | | |
| Bi-axial Stretching Temperature (°C) | 110 | 110 | 115 | 115 | 115 | 115 | 125 |
| Annealing Temperature (°C) | 90 | 90 | 100 | 100 | 105 | 105 | 115 |
| Results | | | | | | | |
| Thickness (μm) | 20 | 20 | 20 | 20 | 20 | 20 | 20 |
| Porosity (%) | 42 | 41 | 40 | 39 | 36 | 35 | 35 |
| Air permeability (Gurley- sec.) | 24 | 20 | 25 | 18 | 31 | 31 | 31 |
| Shutdown Temp. $T_{SD}$ (°C) | 131 | 135 | 132 | 135 | 132 | 136 | 136 |
| Melt Integrity (°C) | 154 | 150 | 155 | 151 | 156 | 152 | 169 |
| Average pore diameter (μm) | <1 | <1 | <1 | <1 | <1 | <1 | <1 |
| Puncture, 1mm pin (grams/25μm) | 345 | 352 | 362 | 365 | 361 | 375 | 248 |
| Thermal Stability (% TD shrinkage at 90°C) | 6% | 4% | 5% | 3% | 5% | 3% | 4% |

Fig. 4

SHUTDOWN SEPARATORS WITH IMPROVED PROPERTIES

PROSECUTION HISTORY

This application claims priority based on U.S. patent application Ser. No. 11/161,194, filed on Jul. 26, 2005, and Ser. No. 11/161,331, filed on Jul. 29, 2005, and U.S. Pat. No. 6,949,315, filed on Sep. 27, 2005, filed on May 12, 2004 by the same inventors as the present application. This is the third CIP based on said invention.

BACKGROUND OF INVENTION

The instant invention is directed to improved battery separator systems suitable for use in lithium batteries. One aspect of the current invention formulation (A) provides a microporous separator extremely high in air permeability of less than 20 sec/10 cc, preferably less than 10 sec/10 cc for better performance (lowest impedance) for consumer applications and also relates to a method for producing the same. Another aspect of the current invention (formulation B) provides a microporous separator with low shutdown temperatures, (less than 110 degrees C.), melt integrity of more than 165 degrees C., preferably more than 200 degrees C. and to meet the safety requirements for HEV (Hybrid Electric Vehicle) applications.

The separators of the current invention will have applications in alkaline battery chemistries if subjected to surface modification, such as hydrophilic treatment by plasma irradiation, impregnation with a surface active agent, surface grafting, etc. In addition to batteries, the products produced by the current invention can be used in various fields of art. They will have applications in air filtration, water purification (a filter for separating microorganisms and viruses from water) and size exclusion.

A single layer separator of formulation (A) with extremely high air permeability, adequate shutdown behavior, good puncture resistance, high melt integrity, very low in shrinkage and low manufacturing costs has advantages over commercially available separators for consumer lithium ion batteries.

A separator with the above characteristics that can shutdown at approximately 135 degrees C. and can keep electrodes apart at temperatures above 165 degrees C. is highly desirable for use in consumer applications.

A single layer separator of formulation (B) with a low shutdown temperature and a high melt integrity has major advantages over commercially available multi-layer and single layer shutdown separators. In the prior art shutdown separators use two or three layers of membranes with different melt temperatures laminated together. They typically use a micro-porous high-density polyethylene (HDPE) shutdown layer laminated (or attached by other means) to one or two supporting layers. These supporting layers are usually made from a polypropylene substrate, either microporous or non-woven. Therefore, the shutdown temperature will be dictated by the melting point of the HDPE inner layer, which is 135 degrees C., with the melt integrity based on the melting point of the porous polypropylene layer (165 degrees C.). Commercially available single layer separators made from HDPEs have melt integrity problems, since they melt down at temperatures above 135 degrees C.

Lithium ion cells have two to three times higher energy density than nickel metal hydride batteries used in the current HEV's. Due to this high energy density of lithium ion batteries, auto makers are eager to replace the currently used nickel metal hydride battery packs in HEV's with a high energy density lithium ion battery pack.

Thus far, safety concerns, primarily the thermal run away characteristics of lithium ion batteries, have been a major obstacle impeding the use of lithium ion batteries in HEV applications. Thermal run away in lithium ion cells may occur due to system failures or accidents, causing the cell's internal temperature to reach over 100 degrees C. Unchecked, it will continue to rise to the point of fire and explosion.

A separator that can prevent this thermal run away is highly desirable for lithium ion batteries used in the HEV's. It should have a shutdown temperature of about 95-110 degrees C. Together with a low shutdown temperature the separator must itself maintain its integrity at elevated temperatures, so that it does not fail and allow the battery electrodes to short circuit. For the present application the separator should also have a melt integrity of above 165 degrees C., and preferably above 200 degrees C.

In prior art, in order to cope with both the shutdown and melt integrity issues, the separator system has been usually combined with one or two supportive layers. An HDPE microporous layer was primarily used as the shutdown layer. However HDPE will melt down at about 135 degrees C. U.S. Pat. No. 5,922,492 teaches making a battery separator comprising a pure polymeric, unfilled microporous polyolefin membrane, usually polyethylene based, laminated to a polyolefin, non-woven fabric, usually a polypropylene supportive layer. This combination achieves shutdown requirements needed for lithium ion cells.

The above prior-art separator does not provide higher temperature structural integrity needed to keep the electrodes separated at high temperatures. However, separators made with inert fillers are able to maintain their structural integrity at high temperatures without utilizing a supportive layer, thus keeping the electrodes separated under these condition.

U.S. Pat. Nos. 5,565,281, 5,922,492, 6,096,213 and 6,180,280 all discuss lamination of different microporous polymeric layers for achieving different properties such as shutdown behavior and puncture resistance. But using two layers bonded together is costly and difficult to manufacture.

U.S. Pat. No. 6,562,519 introduces a single layer microporous film. However, it uses a cross-linking approach to improve the melt integrity and does not contain any filler. Cross-linking procedures usually use a polymer with a double bond in their chain as a cross-linking agent and cross-linking is usually done by the application of heat, and ultraviolet and electron beam bombardment. These procedures are usually expensive, the process is time consuming, and difficult. It is, therefore, not suitable for a low-cost separator production.

U.S. Pat. No. 4,650,730 teaches how to make a shutdown separator by attaching two or three layers of micro-porous sheets to achieve shutdown behavior. The three-layer approach suffers the same disadvantages as the two layer approach, as would be expected.

The current invention uses well-known methods and readily available materials, and subjects them to well-known processes as described in the following paragraphs.

UHMWPE's have superb chemical resistance, high tensile strength, high melt integrity (they do not have a melt index) and excellent pore forming characteristics suitable for battery separator applications.

Inert fillers are also used in the production of battery separators, primarily for achieving better pore structures, creating added tortuosity and increased porosity. However, fillers can also add properties such as structural integrity (high puncture resistance), reduced shrinkage, improved thermal stability, and fire retardation, and they keep the electrodes separated at high temperatures. Examples are filled polymeric sheets such as those described in U.S. Pat. Nos. 3,351,495, 4,287,276, and U.S. Pat. No. 6,372,379 (by current authors), in which, the electrolyte passes through the separator's microporous channels.

LMWPE's, LDPE's and LLDPE's are known in the prior art as shutdown polymers. They have lower melt temperatures than HDPEs and have been used as additives to UHMWPE or HDPE to reduce the shutdown temperatures of the membrane separators.

The current invention utilizes a commonly used prior art process, widely used for producing battery separators for lead acid and in some alkaline batteries, for lithium ion cells. The prior art process starts with the mixing and extruding a polymer and filler (i.e., $TiO_2$ or Silica) with a plasticizer oil at high temperature and pressure through a coat-hanger sheet die, followed by calendering the sheet, followed by the removal of the oil by solvent extraction and heat setting, creating a microporous sheet.

The process of the current invention for producing formulation (A) incorporates a stretching and heat setting step after solvent extraction. For formulation (B) the stretching step is added after calendering followed by solvent extraction and heat setting the film.

SUMMARY OF INVENTION

Against the foregoing background, it is a principal object of the present invention to provide microporous battery separators which possess improved properties with regard to their intended use in lithium ion cells.

It is yet another object of the present invention to provide battery separators which possess improved properties with respect to air permeability (lowest in impedance), toughness, flexibility, and mechanical strength, and which are chemically resistant to the electrolyte.

It is yet another object of the present invention to produce battery separators for lithium ion cells which possess improved safety features with lower shutdown behavior, and higher melt integrity.

It is yet another object of the present invention to provide microporous membranes having an enhanced holding capacity and a uniform surface appearance when wound on a winding tube, for spiral wound, or when used in enveloping by an enveloping machine for prismatic cells, therefore increasing the electrolyte retention, wicking action and ease of assembly.

It is final object of the present invention to provide battery separators with the above characteristics, that can easily be mass produced at relatively low costs.

(A) microporous battery separators comprised of an ultra high molecular weight polyethylene (UHMWPE) having an average molecular weight of $1 \times 10^6$ or more and an inert filler such as titania or other suitable fillers stable in the lithium battery environment. (B) microporous battery separators comprised of a UHMWPE having an average molecular weight of $1 \times 10^6$ or more, a shutdown low molecular weight polyethylene (LMWPE) having an average molecular weight of 4500 or less, preferably less than 1100 and an inert filler.

Utilizing a wet process, formulation (A) starts by mixing and extruding a polymer and filler (TiO2) with a plasticizer (oil) through a sheet die, calendering the sheet, followed by solvent extraction and then dry stretching/heat setting. For formulation (B), the same procedure is followed except the stretching step is performed after calendering, followed by solvent extraction and heat setting the microporous film.

This invention utilizes an inert filler which adds structural integrity at high temperatures, increases the puncture resistance when the battery is subjected to a destructive test, reduces the separator's impedance, increases the porosity, lowers the shrinkage, keeps the electrodes separated at high temperatures for safety reasons. $TiO_2$ filler is also used as a process aid, allowing the addition of a large amount of low molecular weight polymer to the formula for the required low shutdown temperatures.

In accordance with a first aspect of the invention the battery separator is in the form of a microporous membrane consisting of 20-30% by weight of a UHMW polyethylene In accordance with a second aspect of the invention, the membrane has a Mw of $1 \times 10^{-6}$ or higher.

In accordance with a third aspect of the invention, the membrane contains 60-70% by weight of a HDPE having average Mw of between 200,000-500,000.

In accordance with a fourth aspect of the invention the HDPE has 5-15% by weight of $TiO_2$ In accordance with a fifth aspect of the invention the $TiO_2$ has an average particle size of less than 0.2 microns In accordance with a sixth aspect of the invention the separator has a thickness of less than 75 μm.

In accordance with a seventh aspect of the invention the separator has a % porosity of more than 30%.

In accordance with an eighth aspect of the invention the separator has a Gurley of less than 70 seconds.

In accordance with a ninth aspect of the invention the separator has a shutdown temperature of approximately 134° C.

In accordance with a tenth aspect of the invention the separator has a melt integrity of at least 149° C.

In accordance with an eleventh aspect of the invention the separator has a puncture strength of more than 300 grams

BRIEF DESCRIPTION OF DRAWINGS

These, and further features of the invention, may be better understood with reference to the accompanying specification and drawings depicting the preferred embodiment, in which:

FIG. 1 is a chart showing properties of the microporous membranes of examples 1 through 9.

FIG. 2 is a chart showing properties of the microporous membranes of example 10.

FIG. 3 is a chart showing properties of the microporous membranes of examples 11 through 13.

FIG. 4 is a chart showing properties of the microporous membranes of examples 14 through 20.

DETAILED DESCRIPTION

Definitions

In the following description the definitions below will be used, and will take precedence over any other definitions obtained from any other source whatever, except for definitions which appear in the claims.

Stretching ratio: the ratio of the size of the material after stretching to the size before stretching. For instance if the material has a dimension of 12" in width (transverse direction) before stretching and 24" after stretching, then the stretch ratio in the transverse direction will be 2.

porosity: the percentage of air in a microporous membrane.

air permeability: the time required for a measured amount of air to pass through the separator, in units of seconds per cubic centimeter, as measured by the Gurley densometer, Model 4120, in accordance with ASTM-D726(B).

ultra high molecular weight polyolefin: a polyolefin having a molecular weight of greater than 500,000 and less than 10,000,000.

low molecular weight polyethylene: polyethylene having a molecular weight of less than 4000.

shutdown temperature: the temperature at which the impedance of the separator rises to 100 times its initial value, the value when the separator is first installed in the battery melt integrity: the temperature below which the separator will maintain its structural strength sufficient to function as a battery separator.

puncture resistance: the pressure, measured in grams per micron, below which the separator will not puncture.

thermal shrinkage: in the presence of heat elevated in relation to a reference temperature, the percentage as calculated by the following formula:

$$ts = 100 \times (d1-d2)/d1$$

where ts is the thermal shrinkage, d1 is the dimension before shrinkage, and d2 is the dimension after shrinkage heat-setting (verb): exposure to a high temperature sufficient to stabilize the polymer orientation. It is synonymous with "annealing".

machine direction: the direction in which the material from which the separator is fabricated flows through the sheet die during extrusion.

transverse direction: at right angles to the machine direction.

uniaxial stretching: stretching in either the machine direction or the transverse direction, but not both.

biaxial stretching: stretching in both the machine direction or the transverse direction.

inflation stretching; in the case of a blown film, stretching the membrane in both directions after it exits from the extruder.

PREFERRED EMBODIMENTS

The process by which the proposed separators are made is broadly comprised of making a microporous membrane by forming a homogeneous admixture of one or more polyolefin polymers, a suitable plastisizer (oil) for the polyolefin and a particulate filler, each described herein below.

The specific methods for making these sheets are well known in prior art. By way of non-limiting examples, the following references use the similar wet technology, U.S. Pat. Nos. 3,351,495; 4,287,276 and one from the same inventors, 6,372,379. Current inventions incorporate an added stretching step to these processes.

Regarding the preferred method for making the membrane, the components of the admixture are: For formulation (A), an ultra high molecular weight polyethylene (UHMWPE) having an average molecular weight of $1 \times 10^6$ or more and an inert filler such as titania or other fillers stable in the lithium battery environment. For formulation (B), a UHMWPE having an average molecular weight of $1 \times 10^6$ or more, a shutdown low molecular weight polyethylene (LMWPE) having an average molecular weight of 4500 or less and an inert filler stable in the lithium battery environment. The filler adds structural integrity, reduces shrinkage and separates positive and negative plates at high temperatures.

The present invention provides two different formulations for producing microporous polyolefin membranes, (A) for lithium ion cells with maximum performance designed for consumer applications and (B) a low temperature shutdown separator for the HEV applications. The dry blend of formulation (A) is comprised of 4 to 95 weight percent of an ultra high molecular weight polyethylene and 1 to 96 weight percent of $TiO_2$ filler. The dry blend of formulation (B) is comprised of 1 to 90 weight percent of an ultra high molecular weight polyethylene, 1 to 90 weight percent of low molecular weight polyethylene, and 1 to 90 weight percent of $TiO_2$ filler.

Another version of the subject membranes could have the inclusion of carbon black in less than 10 weight percent, based on the total weight of the admixture.

The present invention for both formulations (A) and (B) also provides a method for producing microporous polyolefin membranes which are comprised of some general steps of (a) preparing the above dry blend and (b) extruding the dry blend with from 30 to 90 weight percent suitable plasticizer (plasticizer) through a coat hanger sheet die, and (c) calendering the gel-like extrudate containing filler at 80-110 degrees C. to make a thinner membrane with a more homogenous surface. For formulation (A) the process continues by (d) removing the plasticizer using a solvent extraction method (e) stretching and heat setting the extracted material in transverse direction (TD) at 115-130 degrees C. For formulation (B) the process continues by (d) stretching the gelled like sheet material in transverse direction (TD) at 115-130 degrees C., (e) removing the plasticizer by using a solvent extraction method and (f) heat setting the film at 70-100 degrees C.

The ultra high molecular weight polyethylene used in the present invention must have an average molecular weight of at least 1,000,000. The low molecular weight polyethylene must have an average molecular weight of 700-4,500 and preferably between 700-1100. Plasticizers are well known in prior art and they are usually aliphatic or cyclic hydrocarbons. Liquid paraffin and mineral oils having a boiling point close to or higher than polyolefin are the preferred plasticizers.

Fillers can be selected from a variety of inert metal oxides stable in electrolyte. Due to the moisture sensitivity of lithium ion cells, the fillers used in the formation of the microporous membrane must have very low or no moisture absorption properties and they can be selected from low moisture content titania, alumina, magnesium or calcium hydroxide or mixtures thereof. The preferred filler is $TiO_2$. The filler particles can be of a size ranging from an average of about 0.001 micron to about 10 microns in diameter.

Other minor additives such as carbon black most commonly used in prior art for different reasons such as increasing the surface area or general appearance can also be incorporated in the formulation. Using commercially available carbon black pellets made from a mixture of carbon black and high density or low density polyethylene is more favorable.

Using prior art, conventional stabilizers or antioxidants may be employed in the compositions of the present invention to prevent thermal and oxidative degradation of the polyolefin component. Representatives of the stabilizers are 4,4 thiobis (6-tert-butyl-m-cresol) ("Santonox"), and 2,6-di-tert-butyl-4-methylphenol ("Ionol").

Accordingly, the microporous battery separator is produced by a process which comprises blending a composition of polyolefin, filler material, and plasticizer, using prior art methods and forming said composition into sheet form. For formulation (A) the process is continued by extracting the plasticizer from the said sheet by means of a suitable solvent and subsequently dry stretching/heat setting the sheet by using tentering or other methods. For formulation (B) the process is continued by stretching the sheet by using tentering or other methods, extracting the plasticizer from said sheet by means of a suitable solvent and subsequently dry and heat set the film for thermal stability.

Tentering is the preferred method of stretching for both formulations (A) and (B), however, methods for stretching the sheet are not particularly limited to tentering. The stretching can be conducted uniaxially, biaxially, by inflation, or a combination thereof. The stretching is preferably conducted at temperatures of between 115 to 130° C.

Plasticizer is removed from the sheet by a commonly used solvent extraction method. Examples of extraction solvents include volatile solvents such as pentane, hexane, heptane and decane, chlorinated hydrocarbons such as methylene chloride and carbon tetrachloride.

For formulation (B), drying and heat setting are done in an oven under mild tension. The heat setting is conducted at a temperature range of 70 to 100° C.

For alkaline battery applications, different surface treatment methods can be utilized. The most common method is by using a suitable wetting agent to coat the microporous sheet of the current inventions. The method of coating and type of wetting agents are well known in prior art and there is no need to discuss these in details.

The microporous sheet material made by this method should be a film which is less than 3 mils and preferably less than 1 mil (25 microns). The porosity of the microporous membrane of the present invention is 30-90%, and the air permeability is 1 to 200 Gurley seconds (sec/10 cc) preferably 1 to 50 Gurley seconds.

For formulation (A), the microporous sheets of the present invention further have a shutdown temperature of 130 to 140° C. and a melt integrity of more than 165° C., preferably more than 200° C.

For formulation (B), the microporous sheets of the present invention further have a shutdown temperature range of 95 to 110° C. preferably 100 plus or minus 5° C. and a melt integrity of more than 165° C., preferably more than 200° C. The shutdown behavior and melt integrity are measured by the method described below.

The following test methods were used for measurements:

(1) Thickness

Thickness (mil)—is determined using a precision micrometer.

(2) % Porosity

Determined by measuring the density of the membrane to the density of the starting material and calculating the percent ratio.

(3) Air Permeability

Measured by using a Gurley densometer (Model 4120), ASTM-D726(B)—Gurley is the time in seconds required to pass 10 cc of air through one square inch of product under a pressure of 12.2 inches of water.

(4) Shutdown and Melt Integrity

In order to determine the shutdown behavior in many prior art patents, air permeability was used as the determining factor for shutdown behavior. However, air permeability is not an accurate measurement since it does not simulate the cell conditions and in many cases, a separator that was claimed to be a shutdown separator using that method will not shutdown in the real cell environment. In order to simulate the cell environment, the inventors utilized a procedure developed by Spotnitz, et al., made a cell with kapton tape and two nickel electrodes, soaked the separator in a lithium ion electrolyte of 1 M lithium trifluoromethanesulfonimide (HQ-115, 3M Co.) in a 1:1 by volume solution of propylene carbonate and triethylene glycol dimethyl ether. The separator was then placed between two electrodes and a cell assembly was made. The cell assembly was placed in a Carver press between two heated platens and pressure was applied (less than 50 lbs.), the temperature was raised at a rate of 10° C. per minute and the cell impedance was measured in 10° C. increments. The shutdown temperature, TSD (oC), is defined as the temperature at which the impedance first rises to 100× its initial value.

(5) Average Pore Diameter

Mercury porosimetry analysis was performed. The samples were analyzed with a Poremaster 60 mercury porosimetry instrument.

(6) Puncture Test

Measured by using an IMADA Digital Force Gauge Model DPD-110R, equipped with a 3 mm diameter cylindrical pin. The peak penetration force was recorded with a pin speed of ⅛ per second.

The invention will be explained in more detail by reference to the following Examples, but the invention should not be construed as being limited by these Examples in any way.

Example 1

A dry-blend consisting of 17 parts by weight of a UHMW polyethylene having Mw of $1 \times 10^6$, 3 parts by weight of $TiO_2$ with an average particle size of less than 0.2 microns was prepared. To 100 parts by weight of the dry blend thus prepared were added 0.1 part by weight of an antioxidant. The 25 parts by weight of the resultant mixture were fed into a twin screw extruder. The dry blend mixture was melt-kneaded in the extruder while feeding 75 parts by weight of a liquid paraffin from one or two feed throats making a solution.

The above solution was extruded from a coat hanger die into the form of a sheet approximately 5 mil thick. Using a three-roll calender, the gel sheet was subsequently hot pressed and cooled down producing a 2 to 3 mil thick gel sheet. The liquid paraffin in the gel sheet was extracted by hexane and dried. The dried microporous sheet was subsequently stretched in transverse direction at 125° C. for 200% and also heat set at 125° C., producing a microporous membrane of less than 25 μm in thickness.

Example 2

Except for using a dry blend mixture of 18 parts by weight of a UHMW polyethylene, and the addition of 2 parts by weight of $TiO_2$, the same procedures of Example 1 were repeated to obtain a microporous membrane.

Example 3

Except for using a dry blend mixture of 19 parts by weight of a UHMW polyethylene, and the addition of 1 part by weight of $TiO_2$, the same procedures of Example 1 were repeated to obtain a microporous membrane.

Example 4

Except for using 20 parts by weight of a UHMW polyethylene, and with no filler, the same procedures of Example 1 were repeated to obtain a microporous membrane.

Example 5

A dry blend consisting of 8 parts by weight of a UHMW polyethylene having Mw of $3 \times 10^6$, parts by weight LMW polyethylene having average Mw of 1000 and 2 parts by weight of $TiO_2$ with an average particle size of less than 0.2 microns was prepared. To 100 parts by weight of the dry blend thus prepared were added 0.5 parts by weight of an antioxidant. The 25 parts by weight of the resultant mixture was fed into a twin screw extruder. The mixture was melt-kneaded in the extruder while feeding 75 parts by weight of a liquid paraffin from a feed throat making a dry-blend solution.

The above dry-blend solution was extruded from a coat hanger die into the form of a sheet approximately 5 mil thick. Using a three-roll calender, the gel sheet was subsequently pressed and cooled down producing a 3 mil thick gel sheet. The gel sheet was stretched in transverse direction at 110° C. for 300%. The liquid paraffin in the stretched sheet was extracted by hexane, dried and heat set at 70° C. producing a microporous membrane of less than 25 µm in thickness.

Example 6

Except for using a dry blend mixture of 8 parts by weight of a UHMW polyethylene, 9 parts by weight LMW polyethylene and the addition of 6 parts by weight of $TiO_2$, the same procedures of Example 5 were repeated to obtain a microporous membrane.

Example 7

Except for using a dry blend mixture of 4 parts by weight of a UHMW polyethylene, 5 parts by weight LMW polyethylene and the addition of 3 parts by weight of $TiO_2$, the same procedures of Example 5 were repeated to obtain a microporous membrane.

Example 8

Except for using a dry blend mixture of 4 parts by weight of a UHMW polyethylene, 4 parts by weight LMW polyethylene and the addition of 3 parts by weight of $TiO_2$, the same procedures of Example 5 were repeated to obtain a microporous membrane.

Example 9

Except for using a dry blend mixture of 1 part by weight of a UHMW polyethylene and the addition of 6 parts by weight of $TiO_2$, and the absence of antioxidant, the same procedures of Example 5 were repeated to obtain a microporous membrane.

The properties of the above microporous membranes (Examples 1-9) measured as described above, are shown in Table 1, which appears as FIG. 1.

Example 10

A dry-blend consisting of 86.7% by weight of a UHMW polyethylene having Mw of $1\times10^6$, 6.6% by weight of a UHMW polyethylene having Mw of $3\times10^6$ and 6.6% by weight of $TiO_2$ with an average particle size of less than 0.2 microns was prepared. To 100 parts by weight of the dry blend thus prepared were added 0.1 part by weight of an antioxidant. The 25 parts by weight of the resultant mixture were fed into a twin screw extruder. The dry blend mixture was melt-kneaded in the extruder while feeding 75 parts by weight of a liquid paraffin from one or two feed throats making a solution.

The above solution was extruded from a coat hanger die into the form of a sheet approximately 5 mil thick. Using a three-roll calender, the gel sheet was subsequently hot pressed and cooled down producing a 2 to 3 mil thick gel sheet. The liquid paraffin in the gel sheet was extracted by hexane and dried. The dried microporous sheet was subsequently stretched (dry) in transverse direction at 125° C. for 200% and also heat set at 110° C., producing a microporous membrane of less than 25 µm in thickness.

The properties of the above microporous membranes measured as described above, are shown in Table 2, which appears as FIG. 2.

Example 11

A dry blend consisting of 44.45% by weight of a UHMW polyethylene having Mw of $3\times10^6$, 44.45% by weight of a LMW polyethylene having average Mw of 1000 and 11.1% by weight of $TiO_2$ with an average particle size of less than 0.2 microns was prepared. To 100 parts by weight of the dry blend thus prepared were added 0.5 parts by weight of an antioxidant. The 25 parts by weight of the resultant mixture was fed into a twin screw extruder. The mixture was melt-kneaded in the extruder while feeding 75 parts by weight of a liquid paraffin from a feed throat making a dry-blend solution.

The above dry-blend solution was extruded from a coat hanger die into the form of a sheet approximately 5 mil thick. Using a three-roll calender, the gel sheet was subsequently pressed and cooled down producing a 3 mil thick gel sheet. The gel sheet was stretched (wet) in transverse direction at 80° C. for 300%. The liquid paraffin in the stretched sheet was extracted by hexane, dried and heat set at 70° C. producing a microporous membrane of less than 25 µm in thickness.

Example 12

A dry blend consisting of 44.45% by weight of a UHMW polyethylene having Mw of $5\times10^6$, 44.45% by weight of a LMW polyethylene having average Mw of 1000 and 11.1% by weight of $TiO_2$ with an average particle size of less than 0.2 microns was prepared. To 100 parts by weight of the dry blend thus prepared were added 0.5 parts by weight of an antioxidant. The 25 parts by weight of the resultant mixture was fed into a twin screw extruder. The mixture was melt-kneaded in the extruder while feeding 75 parts by weight of a liquid paraffin from a feed throat making a dry-blend solution.

The above dry-blend solution was extruded from a coat hanger die into the form of a sheet approximately 5 mil thick. Using a three-roll calender, the gel sheet was subsequently pressed and cooled down producing a 3 mil thick gel sheet. The gel sheet was stretched (wet) in transverse direction at 80° C. for 300%. The liquid paraffin in the stretched sheet was extracted by hexane, dried and heat set at 70° C. producing a microporous membrane of less than 25 µm in thickness.

Example 13

A dry blend consisting of 60.52% by weight of a UHMW polyethylene having Mw of $1\times10^6$, 6.58% by weight of a UHMW polyethylene having Mw of $3\times10^6$, 26.32% by weight of a LMW polyethylene having average Mw of 1000 and 6.58% by weight of $TiO_2$ with an average particle size of less than 0.2 microns was prepared. To 100 parts by weight of the dry blend thus prepared were added 0.5 parts by weight of an antioxidant. The 25 parts by weight of the resultant mixture was fed into a twin screw extruder. The mixture was melt-kneaded in the extruder while feeding 75 parts by weight of a liquid paraffin from a feed throat making a dry-blend solution.

The above dry-blend solution was extruded from a coat hanger die into the form of a sheet approximately 5 mil thick. Using a three-roll calender, the gel sheet was subsequently pressed and cooled down producing a 3 mil thick gel sheet. The gel sheet was stretched (wet) in transverse direction at 80° C. for 300%. The liquid paraffin in the stretched sheet was extracted by hexane, dried and heat set at 70° C. producing a microporous membrane of less than 25 μm in thickness.

The properties of the above microporous membranes (Examples 11-13) measured as described above, are shown in Table 3.

Example 14

A dry blend consisting of 25% by weight of a UHMW polyethylene having Mw of $1\times10^6$, 65% by weight of a HDPE having average Mw of $5\times10^5$ and 10% by weight of $TiO_2$ with an average particle size of less than 0.2 microns was prepared. To 100 parts by weight of the dry blend thus prepared were added 0.5 parts by weight of an antioxidant. The 40 parts by weight of the resultant mixture was fed into a twin screw extruder. The mixture was melt-kneaded in the extruder while feeding 60 parts by weight of a mineral oil from a feed throat making a dry-blend solution.

The above dry-blend solution was extruded from a coat hanger die into the form of a sheet approximately 20-30 mil thick. Using calender/cast rolls, the gel sheet was subsequently cooled down producing a 20 mil thick gel sheet. The gel sheet was bi-axially stretched (wet) 5 times in each direction and heat set at a temperature range of 110-125° C. The mineral oil in the stretched sheet was extracted by hexane, dried and annealed at a temperature range of 90-115° C. producing a microporous membrane of less than 25 μm in thickness.

Example 15

Except for replacing HDPE with average Mw of $2\times10^5$, the same ratio and procedures of Example 14 were repeated to obtain microporous membrane.

Example 16

Except for replacing UHMWPE with average Mw of $3\times10^6$ the same ratio and procedures of Example 14 were repeated to obtain microporous membrane.

Example 17

Except for replacing HDPE with average Mw of $2\times10^5$ the same ratio and procedures of Example 16 were repeated to obtain microporous membrane.

Example 18

Except for replacing UHMWPE with average Mw of $5\times10^6$, the same ratio and procedures of Example 14 were repeated to obtain microporous membrane.

Example 19

Except for replacing HDPE with average Mw of $2\times10^5$, the same ratio and procedures of Example 18 were repeated to obtain microporous membrane.

Example 20

Except for replacing UHMWPE with polypropylene (Melt Flow of 12 g/10 min), the same ratio and procedures of Example 14 were repeated to obtain microporous membrane.

The properties of the above microporous membranes (Examples 14-20) measured as described above, are shown in Table 4.

In additional embodiments the ultra high molecular weight polyethylene can be replaced with a high-density polyethylene or a mixture of two or three ultra high molecular weight polyethylene (having different molecular weights) and high-density polyethylene or other polyolefins, polyolefin copolymers or derivatives thereof and the $TiO_2$ filler can be replaced by other suitable and property enhancing stable metal oxide fillers.

While the invention has been described in detail and with reference to specific embodiments thereof, it will be apparent to one skilled in the art that various changes and modifications can be made therein without departing from the spirit and scope thereof.

What is claimed is:

1. A battery separator consisting of 20-30% by weight of a UHMW polyethylene having an average Mw of $1\times10^6$ or higher, 60-70% by weight of a HDPE having an average Mw of between 200,000-500,000 and 5-15% by weight of $TiO_2$ with an average particle size of less than 0.2 microns.

2. A battery separator according to claim 1 that has a thickness of less than 75 μm, % porosity of more than 30%, Gurley of less than 70 seconds, shutdown temperature of approximately 134° C., melt integrity of at least 149° C. and has a puncture strength of more than 300 grams.

3. The battery separator in accordance with claims 1 or 2 wherein said separator is used in a battery containing a non-aqueous electrolyte solution.

4. A battery separator consisting of 20-30% by weight of a polypropylene (melt flow 12 g/10 min), a HDPE having an average Mw of 500,000 and 5-15% by weight of $TiO_2$ with an average particle size of less than 0.2 microns.

5. A battery separator according to claim 4 that has a thickness of less than 75 μm, % porosity of more than 30%, Gurley of less than 70 seconds, shutdown temperature of approximately 134° C., melt integrity of at least 165° C. and has a puncture strength of more than 200 grams.

6. The battery separator in accordance with claims 4 or 5 wherein said separator is used in a battery containing a non-aqueous electrolyte solution.

* * * * *